United States Patent [19]
Zajc et al.

[11] Patent Number: 5,744,888
[45] Date of Patent: Apr. 28, 1998

[54] MULTIPHASE AND MULTIPOLE ELECTRICAL MACHINE

[75] Inventors: Franc Zajc; Ivica Zajc, both of Ljubljana, Slovenia

[73] Assignee: Tiedtke-Buhling-Kinne & Partner, Munich, Germany

[21] Appl. No.: 596,829

[22] Filed: Feb. 5, 1996

[30] Foreign Application Priority Data

Feb. 3, 1995 [DE] Germany .......................... 195 03 610.7
Feb. 3, 1995 [DE] Germany .......................... 295 01 741 U

[51] Int. Cl.⁶ ...................................................... H02K 3/00
[52] U.S. Cl. ........................... 310/185; 310/179; 310/254; 310/268
[58] Field of Search ................................. 310/254, 185, 310/268, 179

[56] References Cited

U.S. PATENT DOCUMENTS

| Re. 34,667 | 7/1994 | Neumann | 310/216 |
|---|---|---|---|
| 3,614,577 | 10/1971 | Honeywell | 318/654 |
| 3,842,300 | 10/1974 | Daykin et al. | 310/216 |
| 4,330,726 | 5/1982 | Albright et al. | 310/254 |
| 4,687,961 | 8/1987 | Horber | 310/186 |
| 4,758,751 | 7/1988 | Hosoya et al. | |
| 4,780,635 | 10/1988 | Neumann | 310/216 |
| 4,847,526 | 7/1989 | Takehara et al. | 310/185 |
| 5,010,267 | 4/1991 | Lipo et al. | 310/162 |
| 5,296,773 | 3/1994 | El-Antably et al. | 310/261 |
| 5,304,882 | 4/1994 | Lipo et al. | 310/156 |
| 5,329,195 | 7/1994 | Horber et al. | 310/68 B |
| 5,376,851 | 12/1994 | Lipo et al. | 310/179 |

FOREIGN PATENT DOCUMENTS

| 0331180 | 9/1989 | European Pat. Off. | |
|---|---|---|---|
| 627805A2 | 12/1994 | European Pat. Off. | H02K 21/12 |
| 2245557B2 | 3/1973 | Germany | H02K 29/02 |
| 2245557 | 3/1976 | Germany . | |
| 3320805 | 12/1984 | Germany . | |
| 3320805A1 | 12/1984 | Germany | H02K 19/10 |
| 91145821 | 1/1992 | Germany . | |
| 91161924 | 3/1992 | Germany . | |
| 4111626A1 | 10/1992 | Germany | H02K 3/28 |
| 195036107 | 2/1995 | Germany | H02K 29/06 |
| 295017414 | 2/1995 | Germany | H02K 29/06 |
| 63-154496 | 3/1990 | Japan | H02K 29/00 |
| 2149976 | 6/1985 | United Kingdom | H02K 29/00 |

OTHER PUBLICATIONS h, Walter. "Wicklung und Montage rotierender elektrischer Maschinen", VEB Verlag Technik Berlin, 1978.
AEG–Telefunken–Handbücher, Band 12, Synchronmaschinen, 1970.
Patent Abstracts of Japan, vol. 15, No. 236(E–1078) re JP–3–70457.
Patent Abstracts of Japan, vol. 14, No. 133(E–902) re JP–1–321850.

*Primary Examiner*—Steven L. Stephan
*Assistant Examiner*—Timothy A. Williams
*Attorney, Agent, or Firm*—Cushman Darby & Cushman, IP Group of Pillsbury Madison & Sutro LLP

[57] ABSTRACT

A multiphase and multipole electrical machine which can be commutated electrically is disclosed. The machine includes a rotor and a stator. The stator has multipole poles divided into zones, each zone corresponding to a respective phase of the machine. A winding conductor is associated with each phase, the conductor being passed in alternating directions around successive stator poles of the corresponding zone. Adjacent stator poles are spaced by a slot width substantially corresponding to the width of the winding conductor, portions of the winding conductor within a slot overlapping one another radially of a longitudinal axis of the stator.

16 Claims, 11 Drawing Sheets

MULTIPHASE AND MULTIPOLE ELECTRICAL MACHINE

BACKGROUND OF THE INVENTION

1. Field of the Invention

The invention relates to a multiphase and multipole machine which can be commutated electrically, the phases being distributed in zones along a stator.

2. Prior Art

Conventional electrical machines normally have two-layer or two-level windings. Since the coils must in this case cross and be passed past one another in the winding overhang, the winding overhangs and, in a corresponding manner, the copper losses as well of such machines are relatively large.

For this reason, Laid-Open Specification DE 33 20 805 proposed a multiphase electrical synchronous machine having a large number of poles, in the case of which the coils of the same phase are arranged side by side and two adjacent coils are located in the same slot. The phases are distributed in zones on the circumference, a distance which corresponds to the angular displacement between the zones having been inserted between the zones.

Figure 12:
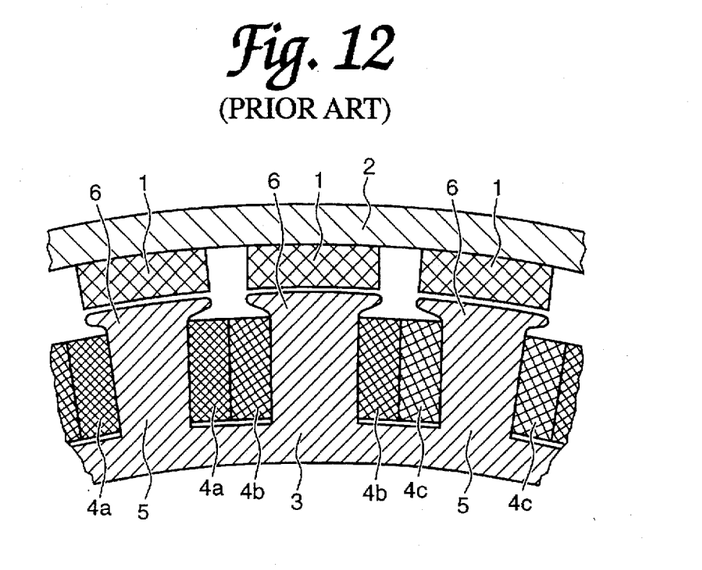
FIG. 12 shows a structural design of an external rotor synchronous machine according to the prior art.

FIG. 12 shows an example of the structural design of such a machine. The illustration shows a detail from a stationary-field machine which is preferably used as an external-rotor machine. The field is produced by radially magnetized permanent magnets 1, which are fitted to a yoke 2 of the rotor. Coils 4a, 4b and 4c of the stator winding are accommodated in grooves in the stator laminate stack 3 of the stator. The teeth 5 of the laminate stack 3 are provided with pole shoes 6 which partially close the slots.

Figure 13:
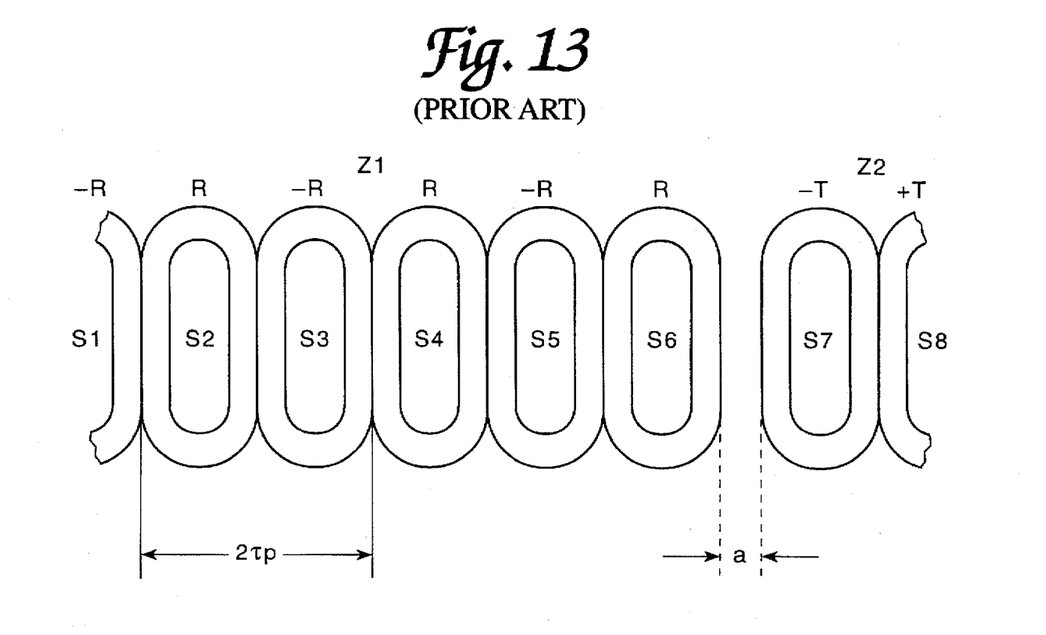
FIG. 13 shows a detail of a stator winding arrangement according to the prior art.

FIG. 13 shows a detail from the winding arrangement of the stator, which comprises six coils S1 to S6, located side by side and having an alternating current-flow direction R, −R in a first zone Z1 (phase R) and two coils S7 and S8, located side by side and having an alternating current-flow direction T, −T in a second zone Z2 (phase T), a physical distance a being provided at the transition from the winding zone Z1 to the winding zone Z2. The sides of two adjacent coils 1 are arranged in the same slot, half the pole slot in each case being filled by the coil located closest to the pole.

One or more winding zones of the same width are arranged on the circumference of the stator per winding phase R, S, T. The distance a between two adjacent zones is chosen, in the case of the six zones which are preferably used, to be equal to one third of the pole pitch. The total of the physical distances a thus leaves a part of the circumference which corresponds to twice the pole pitch unwound. The difference in the number of poles between the rotor and stator is thus equal to two.

According to a further exemplary embodiment of the synchronous machine proposed in DE 33 20 805, the distance a can, however, also be distributed uniformly over each zone. In this case, the pole pitch of the stator winding is greater than the pole pitch of the field, as a result of which a small phase shift is produced between adjacent coils, which phase shift is added within one zone to the phase angle between adjacent winding phases. As a result of the phase shift, the coils in one zone must, however, be connected in series in this case.

In the case of the prior art described above, the entire rotor and stator cross-section is stamped from one laminate. This results in a large amount of material being lost during production, and requires complex stamping dies.

Since the entire rotor and stator cross-section is formed from the ferromagnetic material which is required for magnetic-field concentration, such as electrical sheet steel, machines produced in this manner additionally have a relatively high weight and thus high inertia.

Furthermore, the design of the stator poles and associated winding coils shown in FIG. 12 makes possible only a relatively small number of poles and, because of the relatively large pole cross section, requires a correspondingly large magnetic return flux volume in the yoke of the stator and of the rotor, and thus relatively high weight.

SUMMARY OF THE INVENTION

The invention is thus based on the object of providing a stator and a rotor for a multiphase and multipole machine which can be commutated electrically, by means of which simple production is made possible with a small amount of material loss and high performance of the electrical machine, with low inertia.

According to the stator winding arrangement according to the invention, the slot width between adjacent stator poles corresponds to the width of one winding conductor. This makes possible a considerable reduction in the slot width and increase in the number of poles.

This in turn results in it being possible for the magnetic return path for the stator and rotor poles to be provided in a considerably smaller volume, so that the connecting yoke of the stator and rotor poles can be implemented by means of a relatively thin, and thus flexible, ferromagnetic casing, so that the volume of the active magnetic material is drastically reduced.

Designing the connecting yoke of the stator poles in the form of a casing makes possible a completely novel production method for the stator, in which the poles with the winding conductors located between them are initially fixed on a support by being potted, and those pole ends which are opposite the rotor are not magnetically connected by means of the ferromagnetic casing until this has been done, in order to ensure the magnetic return path. Subsequently, the inner support is removed.

It is thus no longer necessary to stamp out the entire stator cross-section and to wind the stator poles subsequently from the inside.

For example, the winding parts which are located between the laminate stacks can be fitted to the laminate stacks even before the latter are joined together, so that the stator can be composed of a large number of identical individual parts.

It is also possible to arrange the pole laminate stacks initially on a cylindrical body as a structure in the form of a star and subsequently to introduce the winding conductors into the pole slots from the outer circumference of the stator.

If the laminates are aligned radially, the structure in the form of a star can also be stamped in a conventional manner, the inner part of the stamped cross-section being removed after the incorporation of the windings and subsequent fixing, for example by potting by means of synthetic resin or the like.

In this way, the thickness of the tubular stator body, and thus the volume of the active material, can be reduced considerably in comparison with the known embodiment shown in FIG. 12, which leads to a stator having less weight and to improved material utilization for the same material costs.

According to the invention, because of the large number of poles, the rotor can be designed as a hybrid rotor having permanent magnets which are magnetized tangentially and are located on the surface opposite the stator, laminate stacks, which form the poles of the rotor, being formed in layers between the permanent magnets.

In this case, the magnetic return path in the rotor is produced via the permanent magnets, so that the additional ferromagnetic yoke 2 shown in FIG. 12 is unnecessary, and the weight of the rotor can thus be considerably reduced.

If the rotor is formed in layers, in the same way as the stator, to produce a tubular body, then the cylindrical inner body of the rotor can be hollow in the case of an internal rotor machine or can be produced from a material having a low relative density, such as aluminum or plastic for example, which leads to a further reduction in the weight and the inertia.

By fitting the rotor with the type of winding according to the invention, an electrical machine can be implemented which can be regulated via the field current flowing in the rotor winding.

Furthermore, design as a reluctance motor is possible, in which a thin, toothed ferromagnetic layer is formed on the surface of the rotor opposite the stator.

In the case of the embodiments according to the invention and quoted above, only rectangular laminate strips are required for production, so that the previous loss of material resulting from the stamping of the cross-sectional shape of the rotor and of the stator is avoided.

As a result of the considerably greater number of poles in comparison with the above-mentioned prior art, the difference in the number of poles between the stator and the rotor, and thus the number of zones in a phase as well, can be increased, as a result of which the force distribution in the machine is more uniform.

Furthermore, as a result of the smaller volume of the active material through which the magnetic field passes, the magnetic losses (iron losses) are smaller and, because of the smaller winding conductor length and the larger winding conductor width which have been made possible by the winding arrangement according to the invention, the resistive losses (copper losses) are smaller.

Because of the skin effect, the current displacement which occurs in the winding conductor at relatively high frequencies can also be reduced by the winding conductor design according to the invention.

Furthermore, because of the design according to the invention, the machine can be operated at higher frequencies since only one winding conductor is located within one pole slot.

The design according to the invention can be used advantageously in all machines which can be commutated electrically, such as asynchronous machines, synchronous machines, reluctance motors, stepping motors, linear motors etc.

Advantageous refinements of the invention are outlined in the subclaims.

BRIEF DESCRIPTION OF THE DRAWINGS

The invention is described in more detail below, using exemplary embodiments and making reference to the drawing, in which.

DETAILED DESCRIPTION OF PREFERRED EMBODIMENTS OF THE INVENTION

Figure 1:
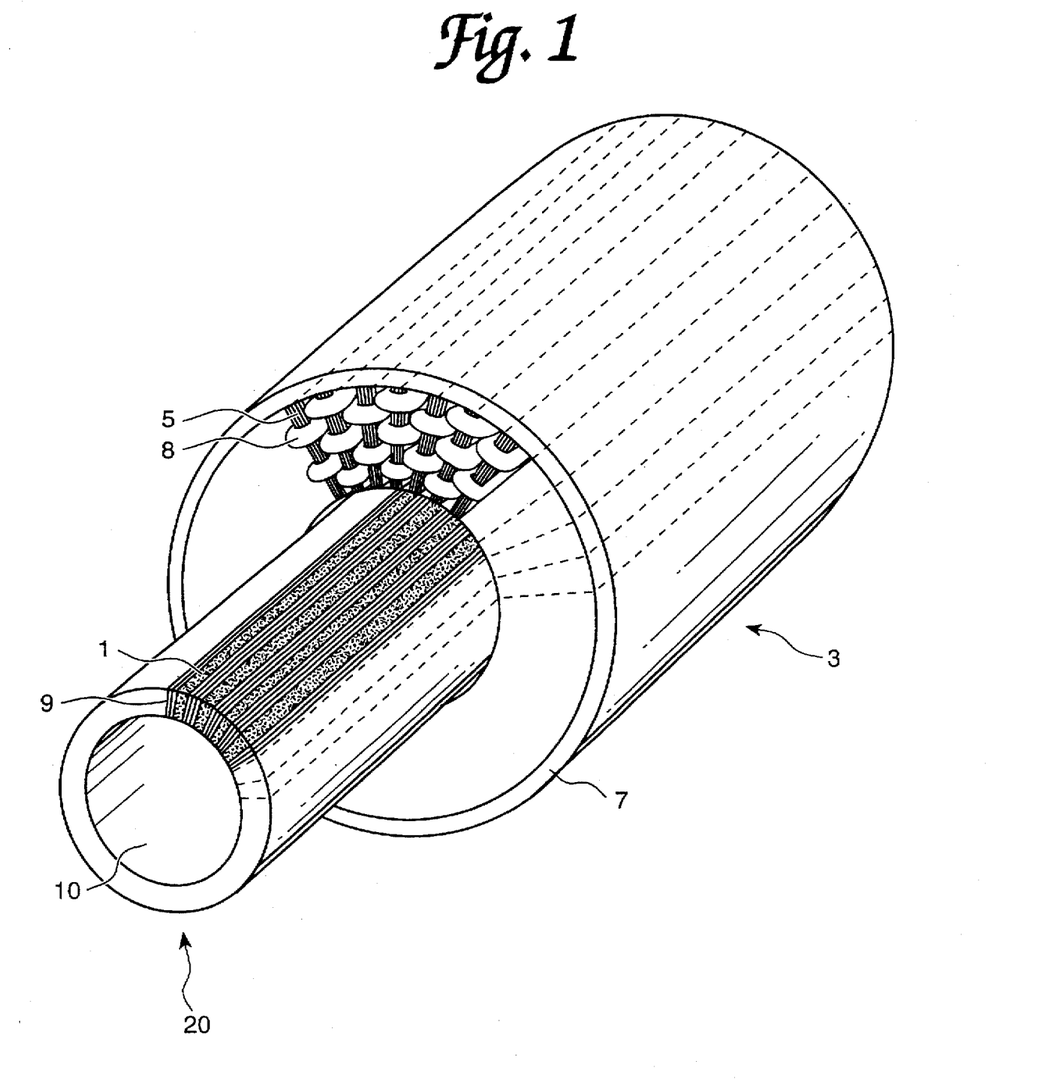
FIG. 1 shows a perspective view of a first exemplary embodiment according to the invention, as a synchronous machine, having an internal rotor.

The first exemplary embodiment which is shown in FIG. 1 is a synchronous machine having an internal rotor 20 and a stator 3. The rotor 20 comprises an inner cylinder 10 and a tubular body which encloses the inner cylinder 10 and is constructed from rotor poles 9, which are formed from axially aligned ferromagnetic laminate strip stacks, with tangentially magnetized permanent magnets 1 located in between.

The magnetization of the permanent magnets 1 is directed in such a manner that magnetic north and south poles are produced alternately at the rotor pole ends, at which poles the magnetic lines of force emerge.

The inner cylinder 10 is composed of aluminum or another material having a low relative density and sufficient strength. Alternatively, the inner cylinder 10 can be omitted completely, so that the rotor 20 is designed as a hollow body.

The rotor 20 can, for example, be produced in such a manner that the permanent magnets 1, which are in the form of small bars, are initially firmly clamped, together with the laminate strip stacks which are in the form of small bars, on the end surface of a cylindrical body, and are subsequently potted using a synthetic resin or the like. The rotor 20 is finally reduced to its final dimensions by grinding away the ends.

The stator 3 is likewise formed from a tubular body which has axially directed laminate strip stacks as stator poles 5 and insulated winding conductors 8, which are wound in between in a meandering shape around the stator poles 5. The view which is illustrated in FIG. 1 shows the stator winding overhang with the multilayer windings of a zone, as well as the withdrawn rotor 20.

During production, the laminate strip stacks are initially likewise secured on a cylindrical body, so that a star-shaped body is produced. Subsequently, the winding conductors are introduced from the outside of the star-shaped body. The cylindrical stator body produced in this way can be potted using a synthetic resin or the like, after which the cylindrical inner body is removed and the inside of the stator is ground to the final internal diameter.

A ferromagnetic casing 7, which forms the yoke of the stator poles 5, is wound around the tubular stator body produced in this way.

However, a radial alignment of the stator pole laminates is also possible, the cross-section of the star-shaped body initially being stamped from a laminate, and the winding conductor subsequently being wound around the ends of the laminates, which are arranged in layers. After potting and encasing of the cylindrical body produced in this way, a cylindrical inner part of the body is removed.

In operation, the lines of force of a permanent magnet 1 of the rotor 20 run through the adjacent rotor poles 9, from where they emerge from the rotor surface of the rotor 20 and are closed by the opposite stator poles 5 and that part of the casing 7 which is used as a magnetic return path for the magnetic field.

The stator poles 5 are preferably split into equal zones, whose windings are assigned an appropriate phase of the system which comprises a multiple of three phases. As a result of the large number of poles which can be implemented in comparison with the prior art quoted above, a higher difference in the number of poles between the stator 3 and the rotor 20 is possible, so that the number of zones per phase can be increased.

In operation, this results in a more uniform force distribution along the circumference, as a result of which the unbalance of the machine is reduced, and smoother running and a lower level of noise production can thus be achieved.

Figure 2:
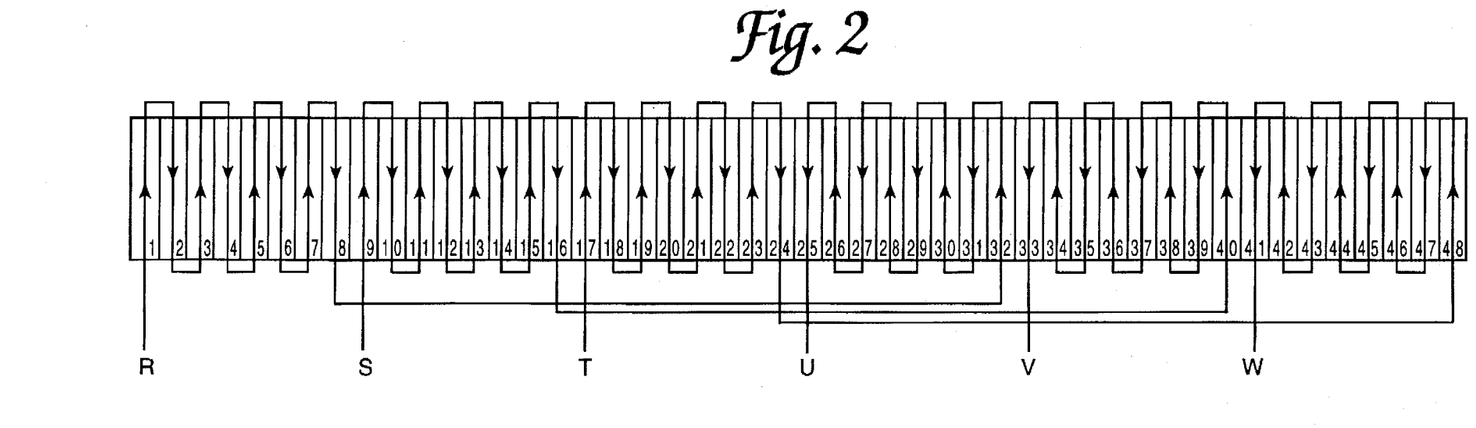
FIG. 2 shows a stator winding arrangement of the first exemplary embodiment according to the invention, having three phases and six zones.

FIG. 2 shows a stator winding arrangement of a stator having 48 poles and 6 zones, as well as the associated connections R, S, T, U, V and W. The winding conductor is wound in a meandering shape around the successive stator poles 5 within one zone.

In the case of generator operation, the rotor 20 has a field winding instead of the permanent magnets 1. The winding conductor of the field winding is wound in a meandering shape around the rotor poles 5, which are formed from laminate strip stacks, in a similar manner to the stator windings, so that a tubular rotor body is produced, which is plugged onto the inner cylinder 10 shown in FIG. 1.

If a DC field current flows through the field winding, then magnetic north and south poles are formed alternately at the rotor pole ends. A sinusoidal voltage is induced in the stator windings by rotation of the rotor 20, the magnitude of which voltage can be regulated by the field current.

Figure 3:
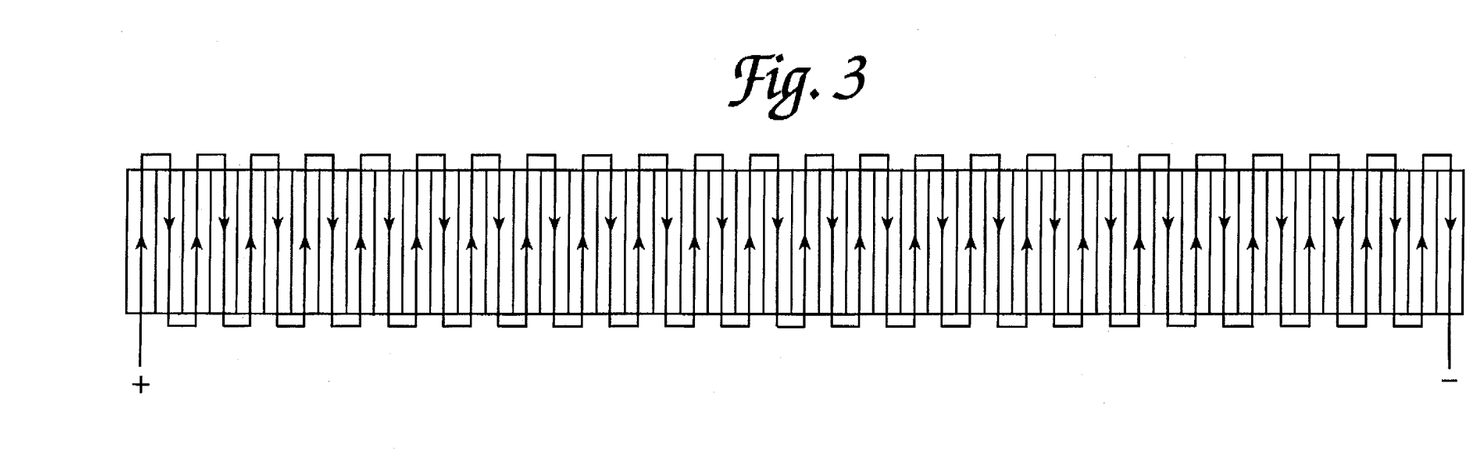
FIG. 3 shows a rotor winding arrangement for a synchronous machine which is operated as a motor or generator.

FIG. 3 shows an unrolled rotor winding arrangement having connecting poles for a DC field current source. In this case, the winding conductor is wound in a meandering shape around the rotor poles 9, along the entire rotor circumference.

The rotor 20 constructed in this way and having a field winding can also be used for implementation of an asynchronous machine.

Figure 4:
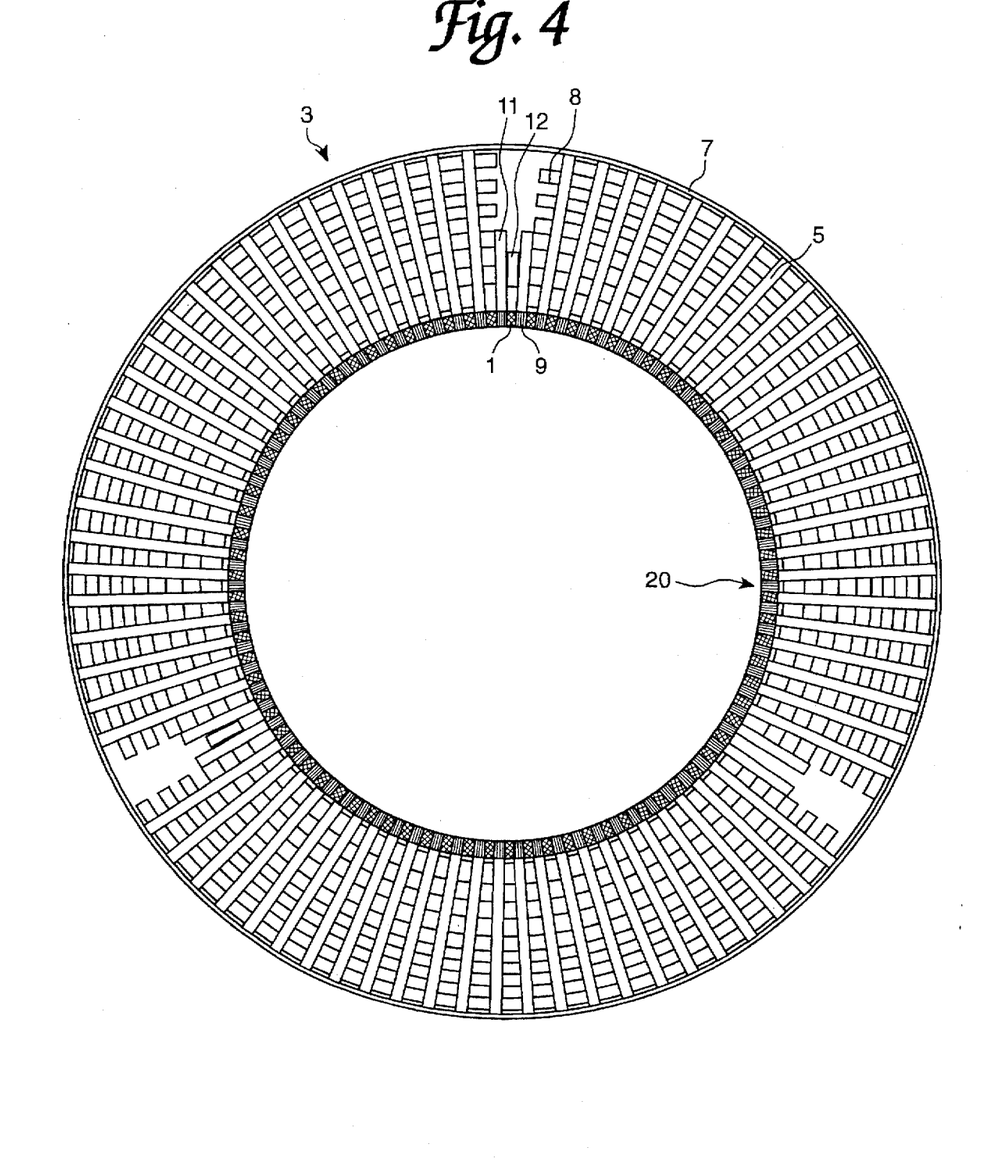
FIG. 4 shows a sectional view of a second exemplary embodiment according to the invention, as a synchronous machine having an internal rotor.

FIG. 4 shows a sectional illustration of a second exemplary embodiment according to the invention having 78 stator poles 5 and 80 rotor poles 9. The internal rotor synchronous machine illustrated has permanent magnets 1 on its rotor surface, corresponding to the first exemplary embodiment shown in FIG. 1, with laminate strip stacks, which are located in between and are aligned in the axial direction, as rotor poles 9.

Axially aligned winding conductor sections 8 are arranged between the stator poles 5, which are likewise formed from laminate strip stacks, which winding conductor sections 8 are in the form of bars and are conductively connected at the respective ends of the stator 3 in such a manner that the meandering winding profile according to the invention is produced.

Shortened stator poles 11 are introduced in predetermined zones of the stator 3, which stator poles 11 are not connected to the ferromagnetic casing 7 which surrounds the stator poles 5, and between which there are no winding conductor sections 8.

Hall sensors 12 or other sensors can be introduced between the shortened stator poles 11 instead of the winding conductor sections 8, by means of which sensors the rotation speed or annular position of the rotor 20 can be detected.

Figure 5:
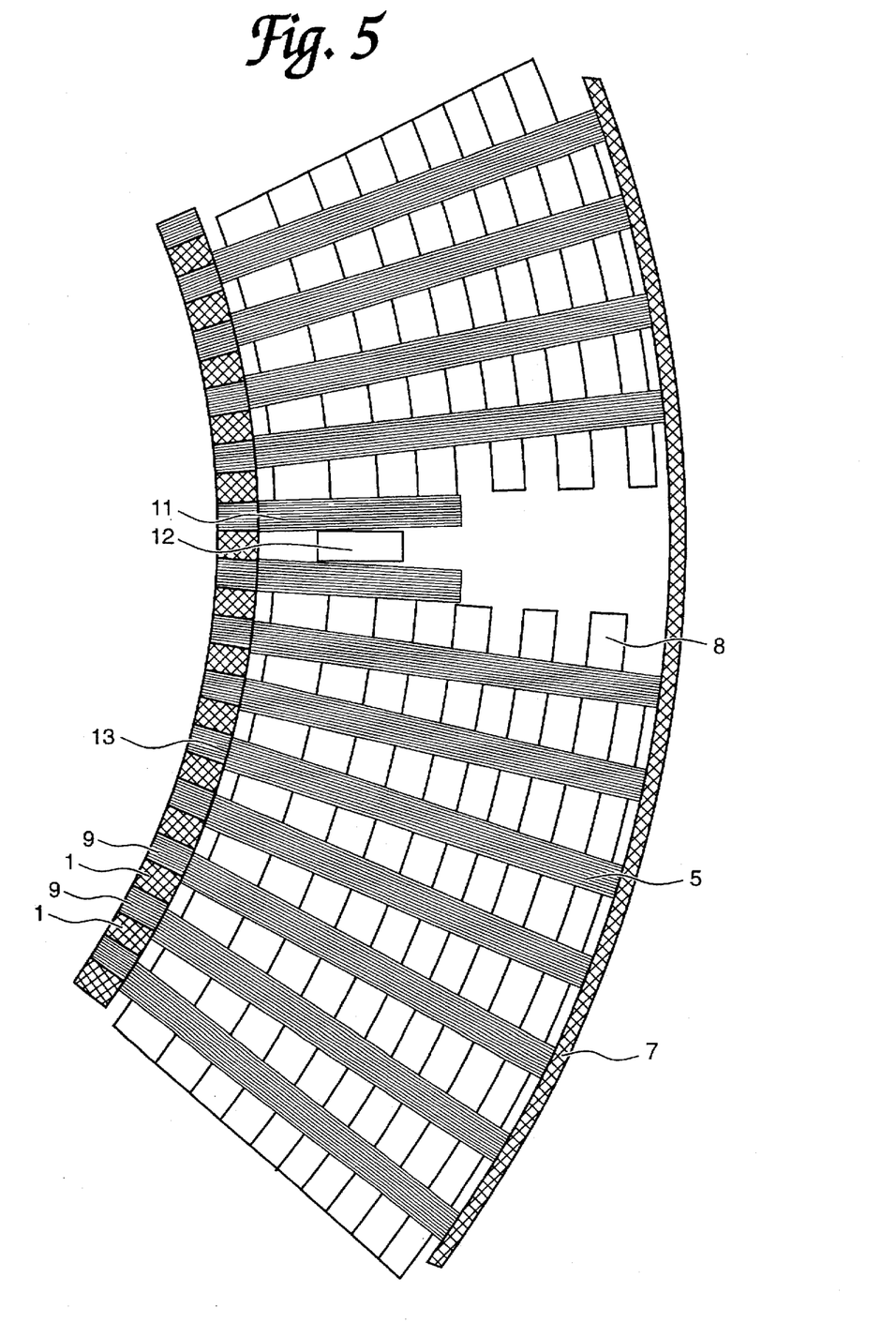
FIG. 5 shows an enlarged detail of the sectional view illustrated in FIG. 4 of the second exemplary embodiment according to the invention.

FIG. 5 shows an enlarged detail of the second exemplary embodiment, it being possible to see the air gap 13 between the stator 3 and the rotor 20.

Figure 6:
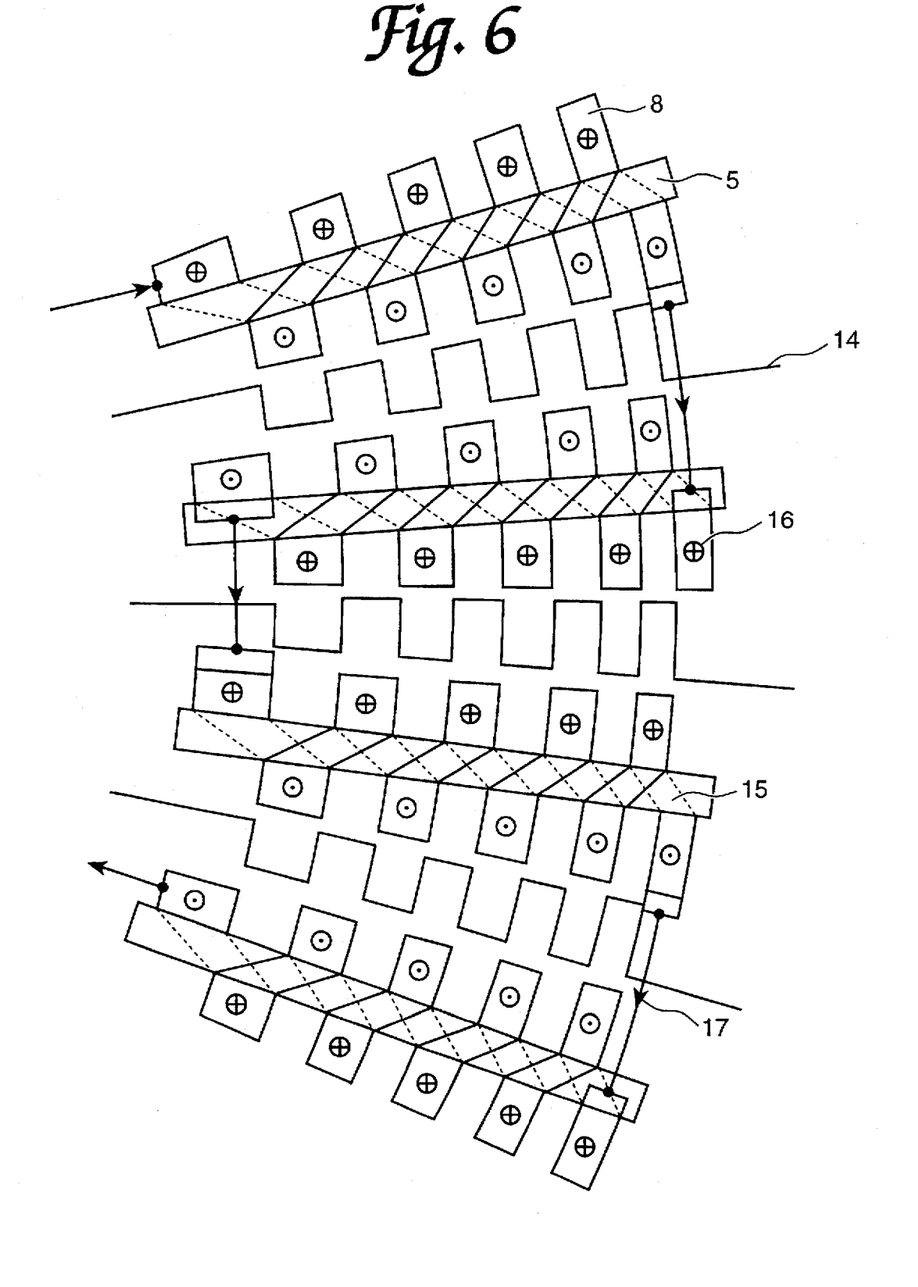
FIG. 6 shows a sectional view of dismantled stator poles with associated winding conductor sections in accordance with the second exemplary embodiment according to the invention.

A plan view of a part of a dismantled stator 3 according to the second exemplary embodiment according to the invention is illustrated in FIG. 6, the stator 3 being constructed from identical pole-winding components. This design leads to a considerably simplified production of the stator 3.

The winding conductors are wound around the stator poles 5 in an electrically insulated manner as early as during the production of the pole-winding components, those winding conductor sections 8 which are arranged on one side of the stator poles 5 being arranged accurately opposite the intermediate space between the winding conductor sections 8 on the other side. The respective axial winding conductor sections 8 on the two sides are connected to one another at the ends of the pole-winding components via obliquely running connecting sections 15.

In this way, the pole-winding components can be arranged in layers on one another, such that they engage in one another, and such that the intermediate spaces between the stator poles 5 are completely filled by the winding conductor sections 8, the pole separation being only one winding width.

A thin insulating film 14 for electrical insulation of the winding conductor sections 8 from one another and from the stator poles 5 is arranged between the pole-winding components, which are arranged in layers on one another.

The ratio of the length of the sides of the winding conductor cross-sections changes in the radial direction, the cross-sectional area remaining constant. This refinement is used to reduce further the current displacement caused by the skin effect.

The winding profile is determined by electrical connections 17, which are produced by means of soldering or metallization, between the corresponding ends of the axially aligned winding conductor sections 8 at the respective ends of the pole-winding components.

A meandering winding profile around the stator poles 5, in terms of the current direction, is also produced in this case.

The arrow markings 16 show the course of the electric current through the winding conductor sections 8.

The stator 3 is produced by arranging layers of the pole-winding components such that they engage in one another, according to FIG. 6, to form a hollow cylinder and by subsequently potting them using a synthetic resin or the like. After this, the internal diameter and external diameter as well as the ends are machined to size. Finally, the hollow cylinder formed in this way is encased on the outer circumference by the ferromagnetic casing 7.

Figure 7:
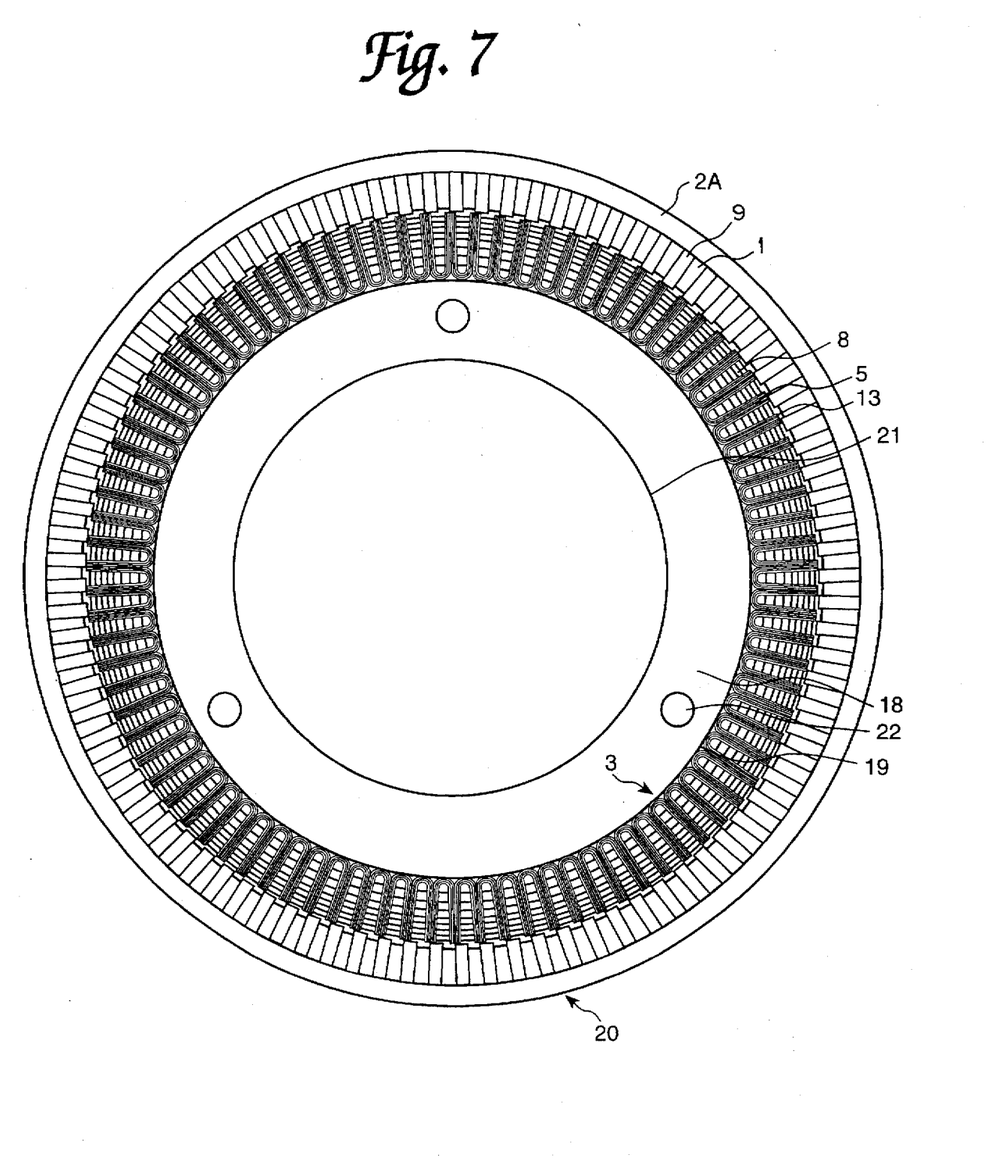
FIG. 7 shows a sectional view of a third exemplary embodiment according to the invention, as a synchronous machine having an external rotor.

FIG. 7 shows a third exemplary embodiment of the electrical machine according to the invention, which is in this case constructed as an external rotor synchronous machine, the externally located rotor 20 having ninety poles and the internally located stator 3 having eighty-nine poles.

The laminate stack strips of the stator poles 5 are designed in a U-shape in the case of this exemplary embodiment and are fitted by means of outwardly directed openings on the outer surface 19 of a hollow cylinder 18. The hollow cylinder 18 has holes 22, by means of which it is screwed to a drive device which contains the motor, the internal diameter 21 being pressed against a conical part of the drive device.

In this case, the grinding away of the internal diameter of the U-shaped laminate stack strips 5 is omitted.

The respective limbs of the laminate stack strips form the stator poles 5, the axially oriented winding conductor sections 8 being incorporated between the limbs of each U-shaped laminate stack strip, such that identical pole-winding components are produced in the present case as well, from which the stator 3 is produced by arranging the winding conductor sections 8 on one another in layers, and subsequently electrically connecting them, at the respective ends.

The tubular external rotor 20 comprises axially aligned laminate stacks as rotor poles 9, which are arranged in layers alternately with tangentially magnetized permanent magnets 1 on one another to form a tubular shape.

The tangential magnetization of the permanent magnets 1 results in the magnetic lines of force which emerge from the rotor pole ends and form the magnetic return path being closed via the permanent magnets 1. The tubular shape, which is formed from layers in this way, is thus surrounded by a non-magnetic casing 2A.

Figure 8:
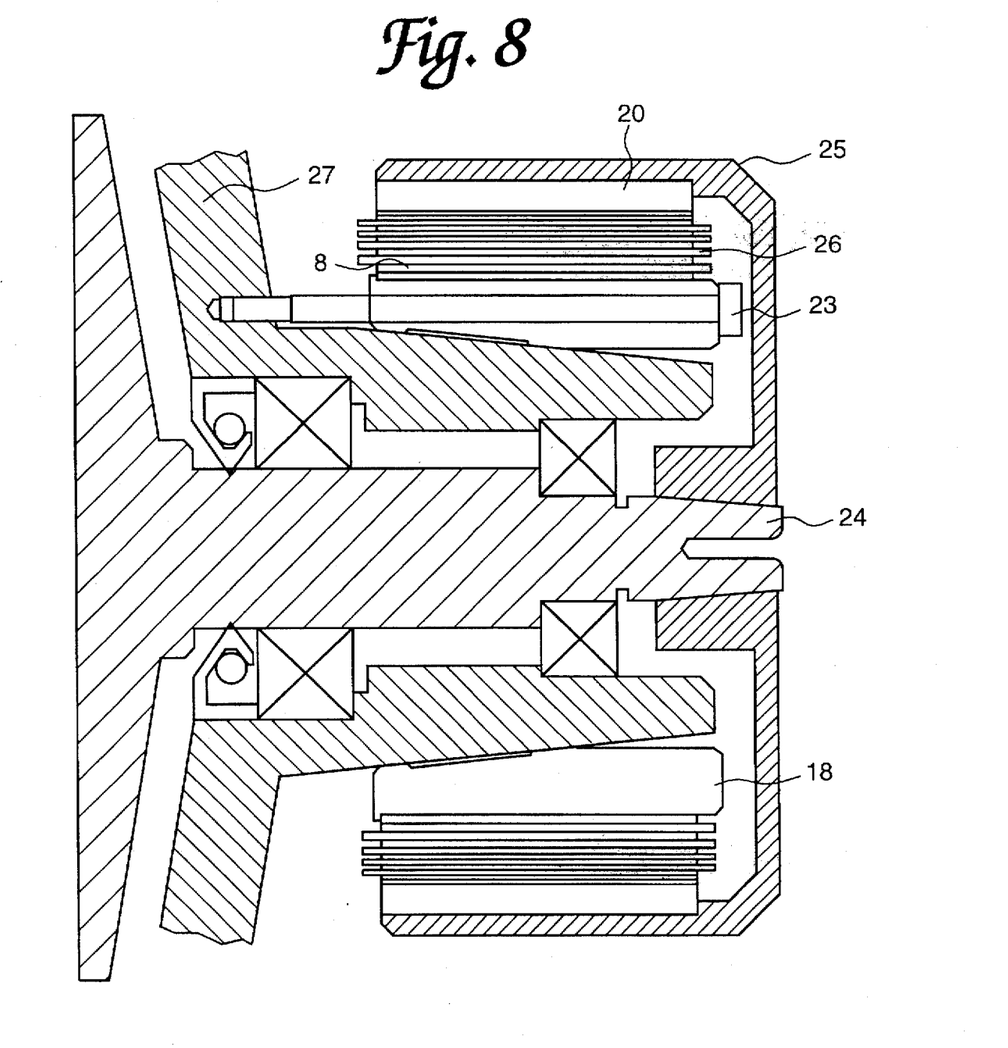
FIG. 8 shows a sectional view of a drive device, in which the external rotor machine is used according to the third exemplary embodiment according to the invention.

FIG. 8 shows a sectional view of a drive device having the external rotor motor according to FIG. 7.

The external motor 20 is fitted on the inside of a bell-shaped body 25 which is used for force transmission and which is secured on a drive shaft 24 which is mounted such that it can rotate. The hollow cylinder 18 is secured on the housing 27 of the drive device by means of screws 23. This sectional illustration of the winding conductor sections 8 also shows that the ends 26 of said winding conductor sections 8 project alternately at one of the two ends of the external rotor motor, so that they can be connected to one another by means of the electrical connections 17 shown in FIG. 6 in order to fix the meandering winding profile.

Figure 9A:
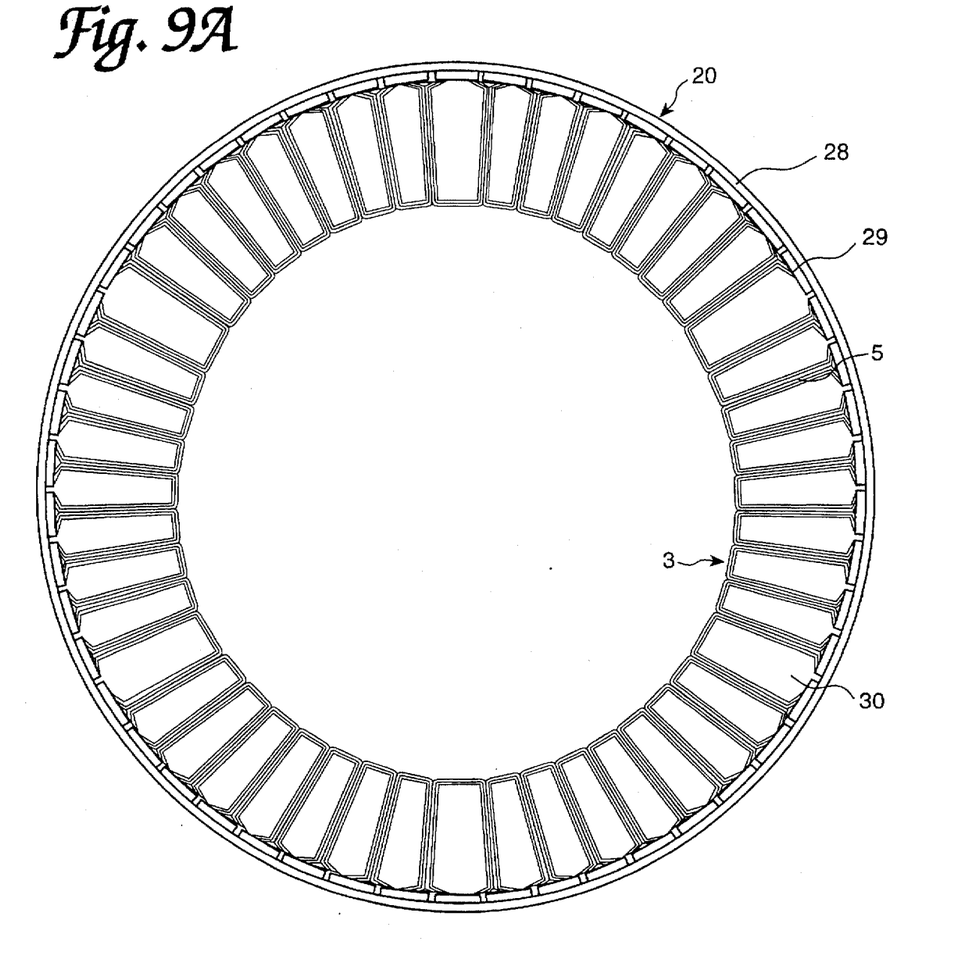
FIG. 9A shows a sectional view of a fourth exemplary embodiment according to the invention, as a synchronous machine having an external rotor.

A fourth exemplary embodiment, as an external rotor synchronous machine having fifty rotor poles and forty-eight stator poles, is illustrated in FIG. 9A.

The external rotor 20, which can also itself be in the form of a bell when the motor is used in accordance with FIG. 8, in this case comprises a ferromagnetic metal tube 28 as the yoke, on whose inside radially magnetized permanent magnets 29 are fitted as rotor poles, the magnetization direction of adjacent permanent magnets 29 being reversed so that magnetic north and south poles are produced alternately at the rotor pole ends.

The stator 3 is constructed in the manner shown in FIG. 7, those limbs of the laminate strip stacks which form the stator poles 5 being bent up at their outer ends, so that the pole ends are enlarged and are matched to the size of the rotor poles 29.

This refinement leads to a reduction in the magnetic flux density at the pole ends of the stator 3 and of the rotor 20, and thus to low forces, less noise being produced, and the capability to provide a larger air gap.

Such a refinement of the pole ends by bending up the pole laminates is also possible in all the other exemplary embodiments described, in order in this way to achieve the advantages stated above.

The stator 3 of the fourth exemplary embodiment has six zones, which are separated from one another by an enlarged pole separation 30. The rotor 20 comprises 25 pole pairs. Since the pole pitch within the stator zones corresponds to that of the rotor 20, the difference in the number of poles between the stator 3 and the rotor 20 results from the sum of the pole separation broadenings along the stator circumference.

In the case of the exemplary embodiments described above, radial forces, which lead to the life of the bearings being reduced, act on the rotor poles and thus also on the bearings of the drive shaft 24.

Figure 9B:
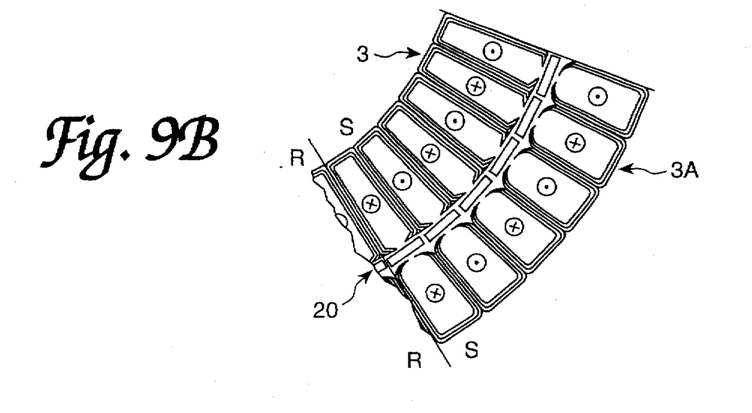
FIG. 9B shows a detail of a sectional view of a modification of the fourth exemplary embodiment according to the invention, in which the stator is designed in two parts in order to reduce radial force components.

The modification of the fourth exemplary embodiment illustrated in FIG. 9B achieves a considerable reduction in the radial force components.

The stator in this case comprises an inner stator part 3, which corresponds to the stator 3 illustrated in FIG. 9A, and a concentric outer stator part 3A having an identical number of poles, the windings of the inner stator part 3 and of the outer stator part 3A being connected in series, and the sizes of the pole slot cross-sectional areas being the same.

The pole ends of mutually corresponding poles of the same phase of the two stator parts 3, 3A are arranged opposite, such that the magnetic lines of force emerge at one pole end of one stator part and run through the permanent magnet 29 of the rotor 20 to the opposite pole end of the second stator part 3A.

Since the magnetic return path in this case passes via the outer stator part 3A, the ferromagnetic yoke 28 is omitted.

The rotor 20 can also be constructed in the manner illustrated in FIG. 4, using tangentially magnetized permanent magnets.

As a result of the series connection of the windings, the currents in the windings of the two stator parts 3, 3A, and thus the magnetic fluxes in the corresponding opposite poles as well, are the same, so that the radial force components acting on the rotor 20 cancel one another out.

The current flow direction in the winding conductors which are wound in a meandering shape around the poles is marked by means of arrow markings which are drawn in the pole slots of the two stator parts 3, 3A illustrated in FIG. 9B.

Furthermore, FIG. 9A shows a change in the winding phase from R to S, which change is arranged at the same point in both stator parts.

Such a two-part stator construction for reducing the radial force components is, of course, also possible in the case of the other exemplary embodiments of the stator 3 described.

Figure 10:
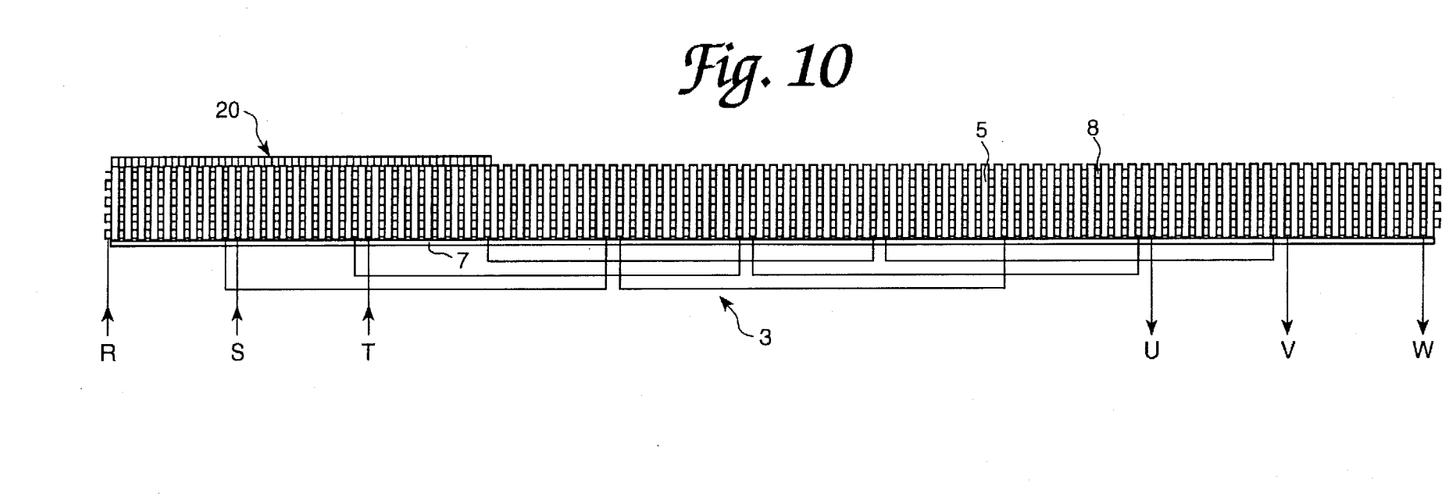
FIG. 10 shows a sectional view of a fifth exemplary embodiment according to the invention, as a linear motor.

FIG. 10 shows a fifth exemplary embodiment according to the invention, as a linear motor.

The design of the illustrated linear motor corresponds to the second exemplary embodiment shown in FIG. 4, the rotor 20 and the stator 3 being designed in linear ("unwound") form.

The rotor 20, which is in the form of a strip, comprises permanent magnets and laminate stacks which are arranged in layers alternately on one another, and can be moved backwards and forwards in a linear manner by producing a travelling field in the stator 3 by means of the phase connections R, S, T on its surface, the connections U, V, W having a common reference-earth potential.

In the present example, the rotor 20 moves on by one rotor pole pair during a phase change of 360° at the phase connections.

The speed thus results from the pole separation of the rotor 20 and the frequency of the power supply, which has a multiple of three phases, flowing through the stator 3.

The stator 3 comprises pole-winding components which are arranged in layers such that they engage in one another and are constructed, according to the second exemplary embodiment, from laminate strip stacks, which are aligned transversely with respect to the movement direction of the rotor 20, as stator poles 5, and from winding conductor sections 8 which are secured thereto, the cross-sectional dimensions of all the winding conductor sections 8 being the same, however, here, since the stator 3 is of linear construction.

Figure 11:
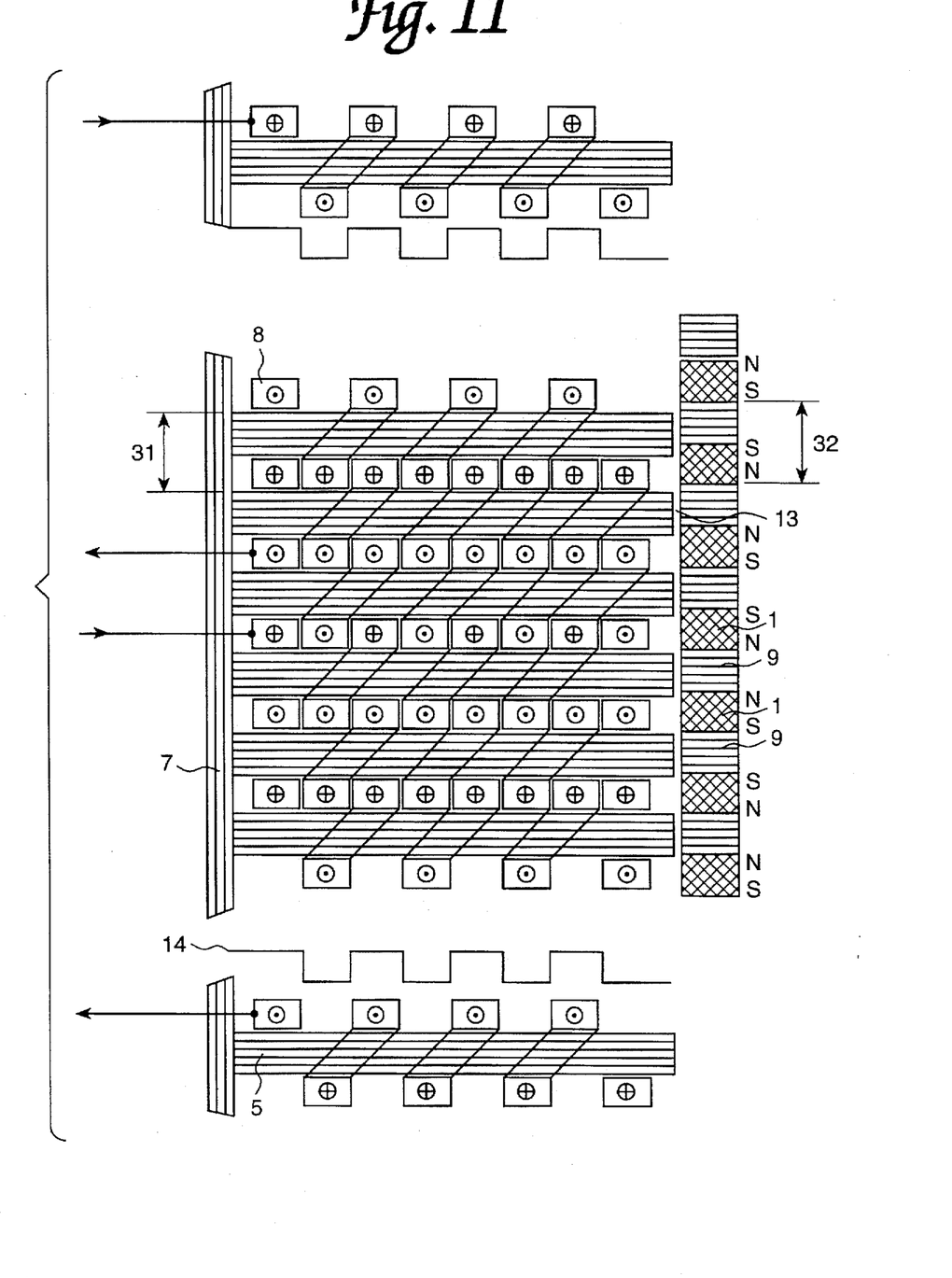
FIG. 11 shows an enlarged detail of the sectional view illustrated in FIG. 10 of the fifth exemplary embodiment, in a partially dismantled form.

FIG. 11 shows an enlarged illustration of a partially dismantled detail of the linear motor. In this case, those parts which correspond to the components shown in FIG. 6 have the same reference numbers.

The other exemplary embodiments which have already been described can also be designed as a linear motor in accordance with the fifth exemplary embodiment illustrated in FIGS. 10 and 11, the necessary changes being obvious to the person skilled in the art.

Multiphase and multipole machine, which can be commutated electrically, having a stator and a rotor. In order to simplify production and to increase the power and torque, the winding conductor is wound around the stator poles in a meandering manner, such that the pole separation between adjacent stator poles corresponds to the width of the winding conductor and is thus greatly reduced. The large number of poles resulting from this allows the stator to be produced in a simple manner by arranging stator laminate strips in layers on one another, with winding conductor sections arranged in between, the stator poles not being magnetically connected at their one pole end, by means of a ferromagnetic casing which forms the magnetic return path, until after the winding conductors have been incorporated. The rotor can be produced in a similar manner by arranging rotor poles in layers one on top of the other with tangentially magnetized permanent magnets arranged in between, as a result of which its weight can also be considerably reduced. More effective material utilization and considerably reduced inertia of the moving parts are achieved by the construction. The construction principle can be used for asynchronous and synchronous machines, linear motors, stepping motors and reluctance motors.

We claim:

1. A multiphase and multipole electrical machine which can be commutated electrically, comprising:

a rotor;

a stator having multiple poles divided into zones, each zone corresponding to a respective phase; and a winding conductor associated with each phase, said conductor being passed in alternating directions around successive stator poles of the corresponding zone; wherein adjacent stator poles are spaced by a slot width substantially corresponding to the width of one winding conductor and wherein the winding conductor is wound around adjacent stator poles in such a manner that portions of the winding conductor of windings of adjacent stator poles are arranged one above the other within one slot.

2. A machine according to claim 1, wherein the stator poles are formed from laminate strips aligned transversely to the direction of movement of the rotor.

3. A machine according to claim 2, wherein the laminate strips are connected to one another in a magnetically permeable manner by a ferromagnetic band located at edges of the strips opposite those adjacent the rotor.

4. A machine according to any one of claims 1 to 3, wherein the stator poles are formed by legs of U-shaped laminate strips.

5. A machine according to claim 3, wherein the winding conductors are in the form of electrically insulated bars extending in a direction parallel to an exterior surface of the stator such that the slots between adjacent poles containing such bars are filled, and wherein bars within adjacent slots within a zone are connected at their ends by electrically conductive connecting pieces.

6. A machine according to claim 5, wherein at least two shortened stator bars, not connected to the ferromagnetic band, are incorporated within a predetermined zone in the stator and wherein a sensor is positioned between said shortened stator bars for detecting at least one of the rotation speed and the annular position of the rotor.

7. A machine according to claim 3, wherein the stator comprises identical laminated components having stator poles with winding conductor sections which are fitted to slot-facing side surfaces of the stator poles in an offset manner, the winding conductor sections on one side surface of a stator pole being arranged intermediate of winding conductor sections on the opposite side of the stator pole such that the slot between adjacent poles is occupied by winding conductor sections in an assembled stator.

8. A machine according to any one of claims 1, 5 or 7, wherein the cross sectional area of winding conductor within a slot is substantially constant.

9. A machine according to claim 3, wherein ends of the laminate strips adjacent the rotor are bent.

10. A machine according to claim 1, wherein:

said conductor is passed around successive stator poles in a meandering way.

11. A machine according to any one of claims 1–3, 5–7 or 9, wherein said rotor and stator are of linear design.

12. A machine according to any one of claims 1–3, 5–7 or 9, wherein the stator is formed from two stator parts having an identical number of poles, the stator parts being arranged in opposing facing relationships to form an air gap within which the rotor is located.

13. A multiphase and multipole electrical machine which can be commutated electrically, comprising:

a stator;

a rotor having multipole poles; and a winding conductor wound in alternating directions around successive rotor poles such that along the circumference of the rotor the magnetization directions of successive rotor poles are opposite, adjacent rotor poles being spaced by a slot width corresponding to the width of one winding conductor and wherein the winding conductor is wound around adjacent rotor poles in such a manner that portions of the winding conductor of windings of adjacent rotor poles are arranged one above the other within one slot.

14. A machine according to claim 13, wherein the rotor poles are formed from permanent magnets which are magnetized at right angles to a circumferential surface of the rotor, the rotor poles being connected to one another by a ferromagnetic band at ends opposite those adjacent the stator.

15. A machine according to claim 13, wherein the rotor poles are formed from stacked laminate strips aligned transversely to the direction of movement of the rotor, and wherein tangentially magnetized permanent magnets are arranged between the rotor poles, the magnetization being directed such that magnetic north and south poles are produced alternately at the edges of the rotor poles.

16. A machine according to claim 15, wherein said rotor poles are mounted on a body formed from a material having a lower relative density than that of the stacked laminate strips and permanent magnets.

* * * * *

UNITED STATES PATENT AND TRADEMARK OFFICE
CERTIFICATE OF CORRECTION

PATENT NO.   : 5,744,888
DATED        : April 28, 1998
INVENTOR(S)  : ZAJC et al.

It is certified that error appears in the above-identified patent and that said Letters Patent is hereby corrected as shown below:

On the title page item [73], delete the Assignee from the above-referenced patent as the identity of the inventor's German patent agent was inadvertently and incorrectly inserted on the Issue Fee transmittal as the assignee.

Signed and Sealed this

Fourteenth Day of September, 1999

Attest:

Q. TODD DICKINSON

*Attesting Officer*      *Acting Commissioner of Patents and Trademarks*